(12) United States Patent
Schorr et al.

(10) Patent No.: US 11,480,413 B2
(45) Date of Patent: Oct. 25, 2022

(54) DYNAMIC AUTOPILOT

(71) Applicant: BAE Systems Information and Electronic Systems Integration Inc., Nashua, NH (US)

(72) Inventors: David J. Schorr, Austin, TX (US); Jason H. Batchelder, Lyndeborough, NH (US); Jeremy B. Gibson, Bedford, NH (US); James H. Steenson, Jr., Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 396 days.

(21) Appl. No.: 16/604,011

(22) PCT Filed: Apr. 10, 2017

(86) PCT No.: PCT/US2017/026775
§ 371 (c)(1),
(2) Date: Oct. 9, 2019

(87) PCT Pub. No.: WO2018/190788
PCT Pub. Date: Oct. 18, 2018

(65) Prior Publication Data
US 2021/0116216 A1    Apr. 22, 2021

(51) Int. Cl.
*F41G 7/36* (2006.01)
*G05D 1/12* (2006.01)

(52) U.S. Cl.
CPC .............................. *F41G 7/36* (2013.01); *G05D 1/12* (2013.01)

(58) Field of Classification Search
CPC .................................. F41G 7/36; G05D 1/12
See application file for complete search history.

(56) References Cited

U.S. PATENT DOCUMENTS

| | | | | |
|---|---|---|---|---|
| 4,840,328 A | * | 6/1989 | Sundermeyer | F41G 7/36 244/3.15 |
| 5,074,490 A | | 12/1991 | Muse et al. | |
| 5,435,503 A | * | 7/1995 | Johnson, Jr. | F41G 7/2246 701/3 |
| 6,254,030 B1 | * | 7/2001 | Sloan, Jr. | G05D 1/12 244/3.21 |
| 2004/0188561 A1 | * | 9/2004 | Ratkovic | F42B 15/01 244/3.1 |
| 2010/0025544 A1 | | 2/2010 | Beaufrere | |
| 2012/0226395 A1 | * | 9/2012 | Revol | G01C 21/16 701/4 |

(Continued)

OTHER PUBLICATIONS

International Search Report, PCT/US17/26775, 10 pages, dated Dec. 26, 2017.
EP Search Report, EP17905480.4, dated Nov. 6, 2020, 7 pages.

*Primary Examiner* — Marcus E Windrich
(74) *Attorney, Agent, or Firm* — Scott J. Asmus; Gary McFaline; Maine Cernota & Rardin

(57) ABSTRACT

[A system and method for dynamic autopilot control comprising providing input to a guidance and control autopilot comprising Mach and dynamic pressure; tailoring parameters of the autopilot, the parameters comprising: roll gain; a pitch/yaw gain; a pitch/yaw loop compensator frequency; a guidance filter bandwidth; a guidance filter lead compensator frequency; and a navigation gain.

18 Claims, 5 Drawing Sheets

(56) References Cited

U.S. PATENT DOCUMENTS

| | | | |
|---|---|---|---|
| 2013/0092785 A1* | 4/2013 | Tournes | F41G 7/2253 244/3.2 |
| 2016/0041196 A1* | 2/2016 | Frey, Jr. | G01P 5/02 702/142 |
| 2016/0349026 A1* | 12/2016 | Fairfax | F42B 10/26 |

* cited by examiner

100

200

$$L_{\delta r} = L_{\delta r}(q, M) = \frac{qS\bar{c}C_{l\delta r}}{I_{xx}} = \frac{S\bar{c}}{I_{xx}} * q * C_{l\delta r}(M)$$

FIG. 2

DYNAMIC AUTOPILOT

FIELD OF THE DISCLOSURE

Embodiments relate to a system and method for projectile dynamic autopilot control and, more particularly, to projectile control for a wide range of flight conditions from low and slow to high and fast.

BACKGROUND

There are a number of target acquisition platforms for mobile assets such as drones, aircraft, and military vehicles. In one example, the target is a military objective and a guided munition or missile is dispatched from a mobile defense asset at the target. The guided munition may have some initial estimation of the target, but uses other mechanisms to accurately direct the guided munition to the target location.

Since the delivered guided munition is destroyed on impact, there is a strong desire to provide an accurate but low cost guidance system since it is only used once. One of the challenges in the industry is providing a high quality and low cost design that is flexible to adapt to the various delivery platforms that travel at different speeds and have varied flight characteristics.

By way of illustration, a rotary wing (RW) platform such as a helicopter is vastly different than a fixed wing (FW), jet, or unmanned aerial vehicle (UAV) platform. There is significant demand to use guided rocket systems on both rotary wing and fixed wing platforms, however the platforms have very different characteristics and operational parameters. In general, it is not necessarily the wing type that determines the difference. It is the launch altitude, speed, and range to target that are different. Categories could be specified as low and slow versus high and fast. For example, a "rotary wing" version could be used for a fixed wing aircraft that will be flying low and slow. Many of the current guided rocket system autopilots have been tuned to achieve maximum performance when used from one platform or the other. It is also less desirable to procure two separate guided rocket system configurations to address the autopilot incompatibility between rotary wing and fixed wing platforms. In addition, users are generally unreceptive to active reconfiguration such as re-assigning current external switch settings on the guided rocket in order to enable the selection of appropriate software parameters for either a rotary wing platform or a fixed wing platform when loaded on the platform, or to adding an additional user configuration device. In general, customers want a single guided rocket system configuration that can be launched from either a rotary wing platform or a fixed wing platform and get reliable, stable, optimal performance from either type of platform automatically.

One existing autopilot solution to handle the wide diversity between the rotary wing flight envelope and the fixed wing flight envelope is to produce two separate guided rocket system configurations that have similar hardware configurations, but have two different software loads. The rotary wing software load is the guided rocket system rotary software configuration. The fixed wing configuration is suited for fixed wing platforms and is loaded with parameters that are tailored for performance and stability for the fixed wing flight envelope.

What is needed is a single adaptive autopilot configuration (hardware and software) to be utilized across a wide range of flight conditions from low and slow platforms to high and fast platforms with good stability and performance in both flight envelopes.

SUMMARY

An embodiment provides a method for dynamic autopilot control of a projectile, comprising obtaining sensor data from at least one on-board sensor, wherein the at least one sensor comprises an accelerometer (405), a temperature sensor (425), and a pressure sensor (415); providing the sensor data to at least one processor (430) coupled to the dynamic autopilot, wherein the processor (430) calculates at least one of Mach and dynamic pressure (305); tailoring parameters of the dynamic autopilot, the dynamic autopilot parameters comprising at least one of a roll control filter parameters (310); a pitch/yaw filter parameters (315); a guidance filter parameters (320); and guiding the projectile to a target using the dynamic autopilot control. In embodiments, the roll control filter parameters comprise a roll gain schedule (535). In other embodiments, the pitch/yaw filter parameters comprise a pitch/yaw gain schedule (550). In subsequent embodiments the pitch/yaw filter parameters comprise a pitch/yaw loop compensator frequency (555). For additional embodiments the guidance filter parameters comprise a guidance filter bandwidth (560). In another embodiment, the guidance filter parameters comprise a lead compensator frequency (565). For a following embodiment the dynamic autopilot parameters comprise a navigation gain (520). In subsequent embodiments the roll and pitch/yaw innermost control loops (540) are rate loops.

In additional embodiments the dynamic autopilot parameters comprise further control loops that depend on airframe transfer functions. In ensuing embodiments the further control loops comprise attitude loops (525). In included embodiments the further control loops comprise acceleration loops (530). In yet further embodiments the further control loops comprise proportional-navigation guidance loops (570). In related embodiments the further control loops comprise augmented proportional-navigation guidance loops (575). For further embodiments the airframe transfer functions comprise aerodynamic control derivatives (Cldr(M) and Cmdp(M)) and dynamic pressure (q).

Another embodiment provides a system for dynamic autopilot control of a projectile to a target, comprising a guidance and control autopilot; at least one on-board sensor, wherein the at least one on-board sensor comprises an accelerometer (405), a temperature sensor (425), and a pressure sensor (415); at least one processor (430) executing a program performing as follows: processing a Mach and a dynamic pressure (305); deriving parameters for the dynamic autopilot, the parameters comprising: a roll gain (310); a pitch/yaw gain (315); a pitch/yaw loop compensator frequency (560); a guidance filter comprising a guidance filter bandwidth (560) and a guidance filter lead compensator frequency (565); and a navigation gain (520); wherein the dynamic autopilot guides the projectile to the target. For yet further embodiments, the roll gain (310) is retrieved from a lookup table and scaled with measured dynamic pressure. For more embodiments, at higher platform speeds associated with fixed wing platforms, the roll gain (310) is inversely scaled with dynamic pressure whereby higher dynamic pressure and Mach sensitivity of aerodynamic control derivatives are accommodated. Continued embodiments include a pitch/yaw loop compensator (540) comprising a filter component that reduces effects of coupling instabilities between pitch and yaw channels. For additional embodiments, a pitch/yaw loop compensator (540) comprises a filter component with a corner frequency related to a flight path pole wherein it is scaled by dynamic pressure.

A yet further embodiment provides a non-transitory computer-readable medium for dynamic autopilot control of a projectile, comprising instructions stored thereon, that when executed on at least one processor, perform the steps of providing input to a guidance and control autopilot; the input comprising Mach and dynamic pressure (305); tailoring parameters of the autopilot, the parameters comprising a roll gain (310); a pitch/yaw gain (315); a pitch/yaw loop compensator frequency (555); a guidance filter (320) comprising a guidance filter bandwidth (560) and a guidance filter lead compensator frequency (565); a navigation gain (520); wherein at higher platform speeds associated with fixed wing platforms, roll gains are inversely scaled with dynamic pressure whereby higher dynamic pressure and Mach sensitivity of aerodynamic control derivatives are accommodated; wherein a pitch/yaw loop compensator (540) comprises a filter component with a corner frequency related to a flight path pole whereby it is scaled by dynamic pressure; and guiding the projectile to a target using the dynamic autopilot control.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 2 depicts control relationships configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Figure 1:
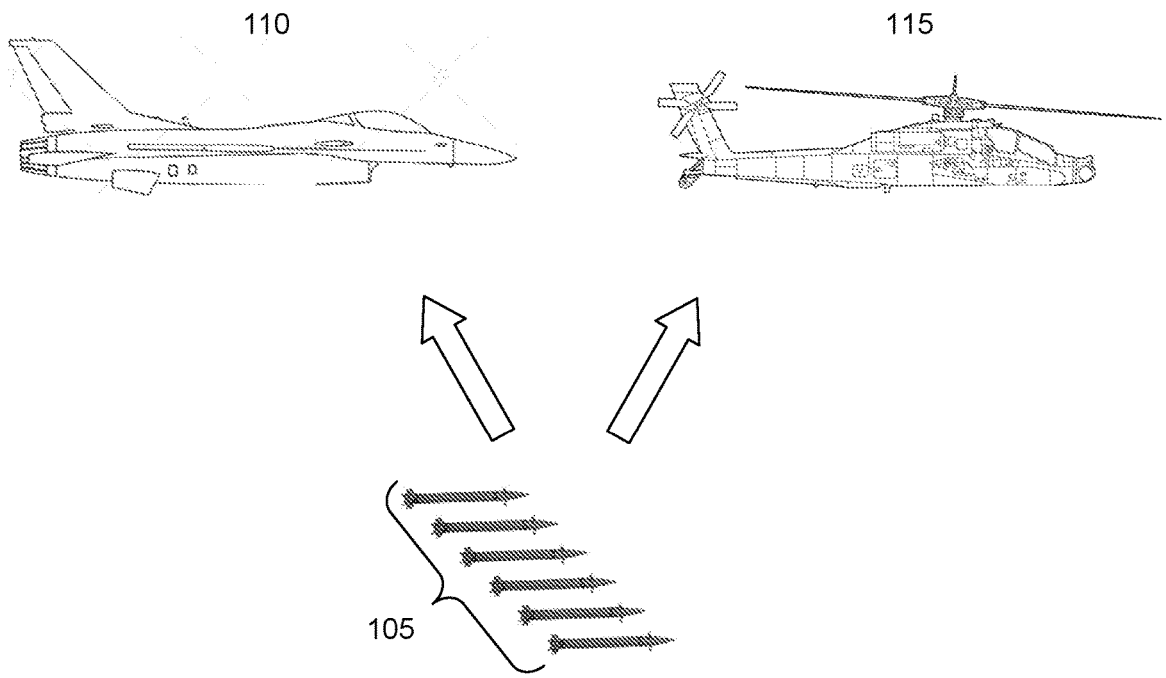
FIG. 1 depicts an operational environment configured in accordance with an embodiment of the invention.

FIG. 1 depicts field deployment operational environment 100 use of a single projectile configuration 105 for fixed wing 110 and rotary wing 115 aircraft. UAV configurations may be fixed wing, but also be deployed as rotary wing assets.

In embodiments, the dynamic autopilot adjusts autopilot gains and parameters in response to actual measured Mach and dynamic pressure. For embodiments, Mach and dynamic pressure are estimated with low cost internal sensors. U.S. patent application Ser. No. 14/818,432, Method and System of Measurement of Mach and Dynamic Pressure Using Internal Sensors, filed Aug. 5, 2014 is incorporated herein by reference in its entirety and for any and all purposes as if fully set forth herein.

Using the Mach and dynamic pressure measurements, the existing autopilot architectures can be utilized with minimal changes to adapt to the measured flight conditions, and preserve both autopilot stability and performance. For embodiments, there are a number of autopilot parameters that are tailored based upon rocket Mach and dynamic pressure to maintain stability and performance. In one example there are six parameters:
1. Roll gain.
2. Pitch/Yaw gain.
3. Pitch/Yaw loop compensator frequency.
4. Guidance filter bandwidth.
5. Guidance filter lead compensator frequency.
6. Navigation Gain.

FIG. 2 depicts control relationships 200 using Mach and dynamic pressure. The Roll and Pitch/Yaw innermost control loops contain the airframe transfer functions, which include aerodynamic control derivatives (Clδr(M) and Cmdp(M)) as well dynamic pressure (q) as shown below for the roll channel.

$$L_{\delta r} = L_{\delta r}(q,M) = q \bar{S} \bar{c} C_{1\delta r} / I_{xx} = \bar{S} \bar{c} / I_{xx} * q * C_{1\delta r}(M)$$

Specifically, $L_{\delta r}$ is a function of dynamic pressure q and Mach M, $L_{\delta r}(q,M)$. $L_{\delta r}(q,M)$ equals $((q\bar{S}\bar{c}C_{1\delta r})/I_{xx}$ where $S$ $\bar{c}/I_{xx}$ is a constant, q is estimated via software, and $C_{1\delta r}(M)$ is obtained from a table of $C_{1\delta r}$ vs. M stored within the autopilot and selected based on Mach estimation.

Since both Mach and dynamic pressure estimates are available, the autopilot gain scheduling can be translated (from low-speed flight envelopes) to other flight conditions that include the fixed wing flight envelope.

Minimum gain margins in the low and slow configuration are observed at sea level air density and maximum rotary wing platform launch velocity. When the measurements of Mach and dynamic pressure are available in flight, the desired roll gain can be determined, and then scaled with the measured dynamic pressure. In this manner, the roll gains are approximately reproduced in the maximum speed sea level rotary wing reference trajectory. At higher platform speeds associated with fixed wing platforms, the roll gains are inversely scaled with dynamic pressure to acknowledge the effect of higher dynamic pressure as well as the Mach sensitivity of the aerodynamic control derivatives. The lateral rate loops (Pitch and Yaw) are addressed in an identical manner.

In addition, the Pitch/Yaw loop compensator has a filter component that reduces the effects of coupling instabilities between the pitch and yaw channels. The corner frequency for this filter component is related to the flight path pole so it is scaled by the dynamic pressure.

The guidance filter bandwidth is driven primarily by the closing velocity with the target. The guidance filter bandwidth is adjusted based upon the Mach measurement as a reasonable approximation to rocket closing velocity with the target.

The guidance filter lead compensator frequency that offsets the flight path pole of the rocket airframe is scaled by dynamic pressure since the flight path pole is driven primarily by dynamic pressure.

In embodiments, the navigation gain is adjusted based upon the measured Mach.

Embodiments are very useful in any guidance and control (G&C) application where automatic autopilot parameter selection would be desirable utilizing only low cost internal sensors to estimate flight conditions.

Figure 3:
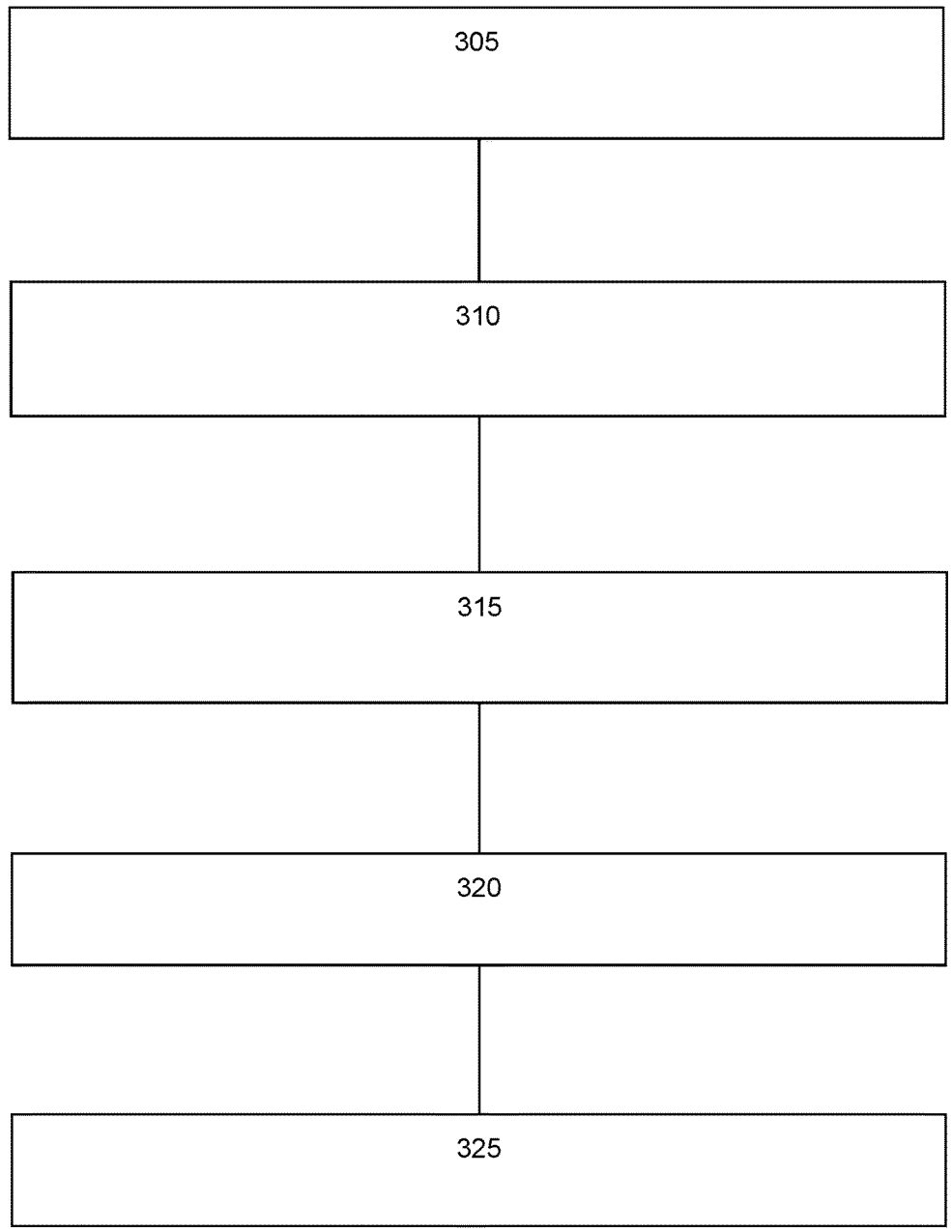
FIG. 3 is a flow chart of the steps of a method for dynamic autopilot control for a wide range of flight conditions from low and slow to high and fast configured in accordance with an embodiment.

FIG. 3 is a flow chart 300 of the steps of a method for dynamic autopilot control for both low-speed flight envelopes and high-speed flight envelopes. For embodiments, the steps comprise determining Mach and dynamic pressure data from sensor data 305; determining optimal autopilot roll control (filter) parameters 310; determining optimal autopilot pitch and yaw (filter) parameters 315; determining optimal autopilot guidance filter parameters 320; and repeating sensor measurements 325, calculating Mach and dynamic pressure as required to maintain optimal autopilot performance all the way to target impact. In embodiments, the first estimate of flight condition is determined within 0.1 to 0.2 seconds after motor burnout. After initializing the Mach and dynamic pressure estimates, embodiments continuously update autopilot parameters. In other embodiments, updates to Mach and dynamic pressure are made a few times a second initially when the rocket is decelerating rapidly. For other embodiments, each application of has different requirements and update rate needs. The calculation interval range for embodiments may vary by application. According to one example, Mach and dynamic pressure are estimated based upon sensor data from an accelerometer, a pressure sensor and a temperature sensor. According to another example, of the several sensors such as accelerometer, pressure sensor, and temperature sensor, the sensor data is obtained from at least one of the sensors. As mentioned, the sensor data is used to calculate both Mach and dynamic pressure. Mach and dynamic pressure are then used to select or determine more optimal autopilot filter parameters for the autopilot digital filter equations than would be possible without specific knowledge of the rocket's flight condition. In embodiments, autopilot roll control filter parameters comprise autopilot roll control filter gains and autopilot roll control filter frequencies. Tailoring autopilot filter parameters comprises optimizing autopilot behavior by using the measured values for Mach and dynamic pressure to calculate or lookup optimal autopilot filter parameters that are pre-calculated and stored for the given measured flight condition. For embodiments, all autopilot parameters are stored onboard. Once Mach and dynamic pressure are known/measured, the appropriate stored values are retrieved or interpolated from stored tabular data. In other embodiments, autopilot parameters are retrieved from linear or polynomial equations (fits to tabular data), rather than the actual tabular data itself. For some embodiments there is reasonably good knowledge of the current Mach and dynamic pressure; in others there is only a very crude estimate based on time of flight. In embodiments, a Mach table is used to lookup autopilot parameters (gains/frequencies/other parameters), and dynamic pressure is used to scale autopilot parameters based upon ratio of measured dynamic pressure/reference dynamic pressure. For embodiments, fewer than six autopilot values are processed for tailoring, for some embodiments, more than six. Incremental performance improvement comes with the optimization of each of the parameters. Embodiments are contrasted with solutions that do not measure Mach and dynamic pressure, so gains and parameters are determined based upon estimated flight time and looking up required parameters based on an average Mach/dynamic pressure profile vs. time. Compared to solutions that do not measure Mach and dynamic pressure, embodiments have very large deviations in the estimate of Mach and dynamic pressure from an average profile when applied to both RW launch conditions (low and slow) and FW launch conditions (high and fast). In embodiments, each autopilot parameter gets only Mach and/or dynamic pressure and/or velocity as an input. However, in embodiments both Mach & dynamic pressure are calculated. Large variations in guidance parameters can occur with only Mach and not dynamic pressure. Also, there can be large variations due to dynamic pressure independent of Mach. Steps are not necessarily serial, or dependent on each other; they may be carried out in different orders.

Figure 4:
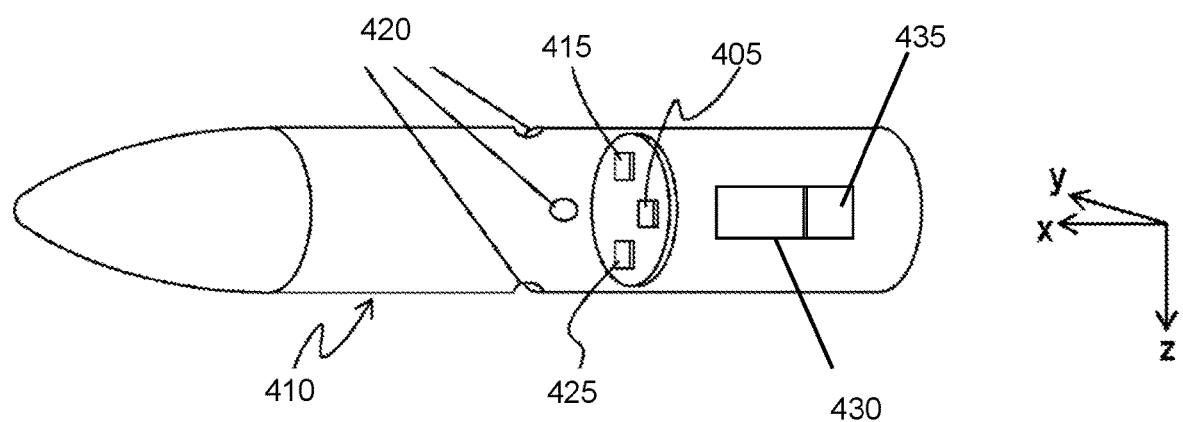
FIG. 4 is a diagrammatic illustration of a missile showing internally carried sensors configured in accordance with an embodiment.

FIG. 4 is a diagrammatic illustration 400 of a rocket showing internally carried sensors for the determination of dynamic pressure and Mach number as well as velocity. As shown in FIG. 4, there are a number of internal sensors that are utilized about the missile housing. These include an accelerometer 405 placed within the body of system 410 that measures the deceleration along the x axis of the missile. In embodiments, the sensing axis of the accelerometer 405 is mounted along the longitudinal axis of the airframe coincident with the center of gravity (CG) of the system. If using a triaxial arrangement of accelerometers, other mounting orientations are allowable as the acceleration along x can be calculated using the measurement of the acceleration vector and knowledge of the orientation of the device. Mounting at locations other than the CG may require the addition of angular position or angular rate sensors to compensate for centripetal accelerations using compensate techniques well understood by those practiced in the art.

Pressure sensor 415 is also placed within the body of system 410. In embodiments, the pressure sensor must be able to observe the static pressure of the ambient atmosphere. It therefore cannot be hermetically sealed within the body of system 410. Entry ports 420 are provided to equalize pressure inside and outside the body. These entry ports can be purposely added ports or they may be provided by the access provided by deployed wing surfaces. In addition, care must be taken in the placement of the access ports relative to the shock wave generated by leading surfaces of the airframe. They must either be placed at sufficient distance to eliminate pressure variation from the shock wave or calibrated to account for the pressure offset as a function of Mach.

Optionally, a temperature sensor 425 can be included for the purposes of relating Mach to true airspeed. The temperature sensor needs to measure ambient air temperature outside of the body. This can be a difficult requirement as every mounting surface in the system has an inherent delay in temperature due to the thermal capacitance of the materials. In addition, electronics housed within the body of the system tend to heat the enclosed housing, causing a differential in temperature relative to free stream air temperature. The inherent accuracy of a true airspeed measurement is dependent on proper placement of the temperature sensor.

There is a processor 430 on-board the guided munition and communicatively coupled to the sensors 405, 415, 425 to obtain the data for processing. The processor 430 is also coupled to a memory section 435 and can be further coupled to a communications unit that receives and/or transmits information or commands. The memory section 435 in one example stores the software program that is executed by the processor 430. In one example the processor 430 performs the computing functionality of the guided munition which includes the dynamic auto-pilot.

Mach number, dynamic pressure, and velocity are calculated from measurements taken internal to the missile of FIG. 4, in accordance with an embodiment. The accelerometer 405 and pressure sensor 415 may be interfaced to the processor 430 which computes dynamic pressure and Mach. The temperature sensor 425 also may be coupled to the processor 430 to allow for the calculation of true airspeed.

The axial acceleration of the air vehicle is completely described by the following equation:

$$a_x = \frac{qS}{m}[C_{aOB}(v_m, \alpha, \varphi) +$$

$$C_{adp}(v_m, \theta_p, \alpha, \varphi) + C_{ady}(v_m, \theta_y, \alpha, \varphi) + C_{adr}(v_m, \theta_r, \alpha, \varphi)]$$

Where q is the dynamic pressure, S is the reference area, m is the mass, $C_{aOB}$ is the drag coefficient for the body, dependent on Mach velocity ($v_m$) angle of attack ($\alpha$) and roll angle $\varphi$. $C_{adp}$ is the pitch command drag coefficient with an additional variation with pitch "flap" command angle $\theta_p$, $C_{adr}$ is the roll command drag coefficient with an additional variation in roll "flap" command angle $\theta_r$, and $C_{ady}$ is the yaw command drag coefficient with an additional variation in yaw "flap" command angle $\theta$. The drag coefficients are determined by measurements in a wind tunnel.

A simplified version of this relationship is:

$$a_x \approx \frac{qS}{m} C_{aOB}(v_m, 0, 0) = \frac{qS}{m} C'_{aOB}(v_m)$$

Dynamic pressure, q, is related to Mach as:

$$q = \frac{\gamma P v_m^2}{2}$$

Where $\gamma$ is the ratio of specific heats, equal to 1.4 for air, and P is the static pressure. The relationship between the Mach velocity and the measured axial acceleration and pressure is:

$$H_{a_x P}(v_m) = \frac{\gamma v_m^2 S}{2m} C'_{aOB}(v_m) \approx \frac{a_x}{P}$$

Where H is Mach, $a_x$ is axial acceleration, and P is static pressure. From these measurements and relationships, dynamic pressure and Mach are provided as input to the dynamic autopilot control. Note that for embodiments, this flight condition data could come from other sources.

Figure 5:
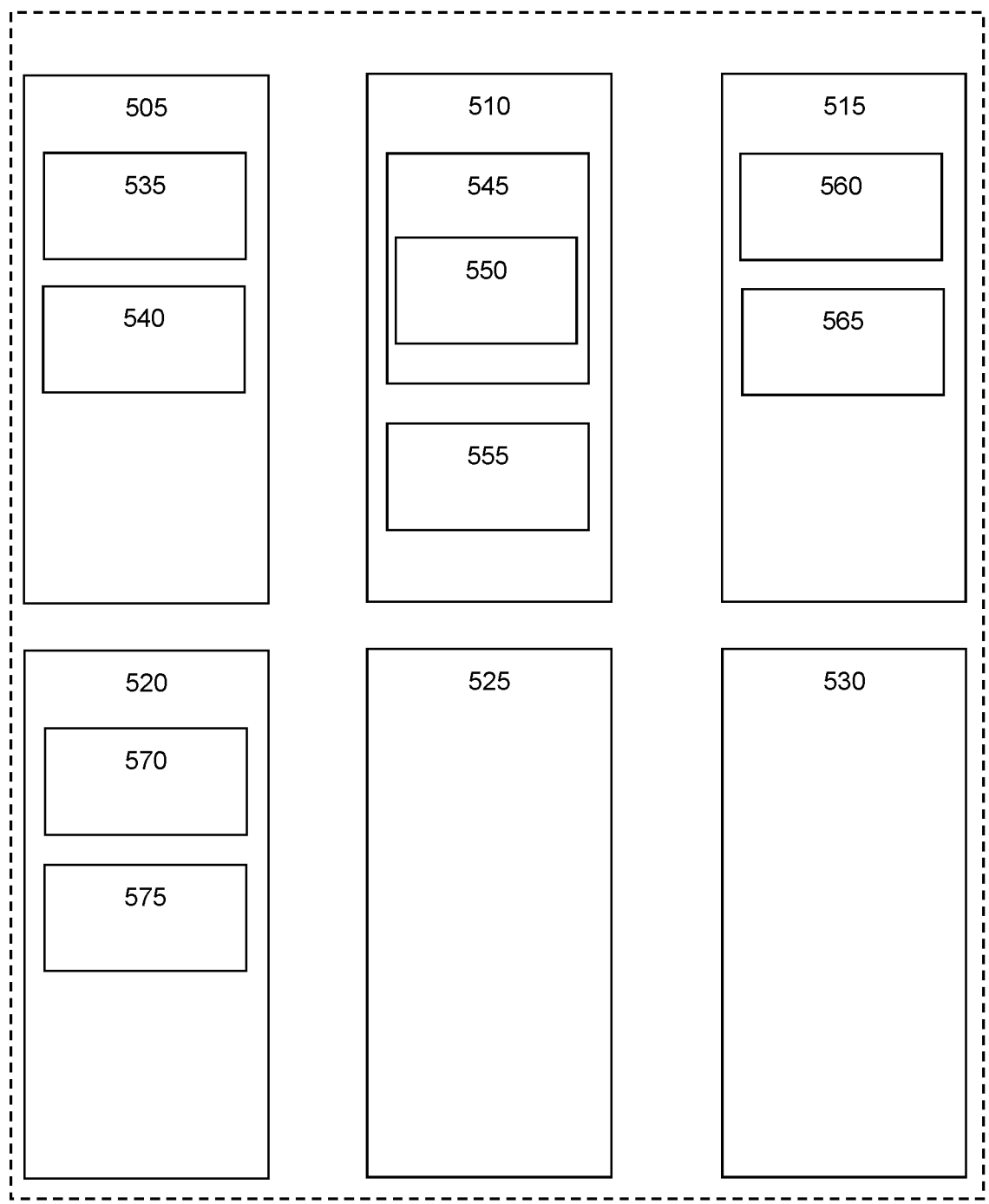
FIG. 5 is a block diagram of a dynamic autopilot control system configured in accordance with an embodiment.

FIG. 5 is a block diagram depicting the functional components of a dynamic autopilot control system 500. Components comprise roll control filter parameters 505; pitch/yaw filter parameters 510; guidance filter parameters 515; navigation gain parameters 520; attitude loops 525; and acceleration loops 530. Roll control filter parameters 505 comprise roll gain schedule 535; and roll innermost control loop 540. Pitch/yaw filter parameters 510 comprise pitch/yaw gain 545; pitch/yaw gain schedule 550; and pitch/yaw loop compensator frequency 555. Guidance filter parameters 515 comprise guidance filter bandwidth 560; and guidance filter lead compensator frequency 565. Navigation gain parameters 520 comprise pro-nav guidance loops 570 and augmented pro-nay guidance loops 575.

Embodiment advantages include a large cost savings in the manufacture of guided rockets as well as enormous cost and logistics benefits in the user community since any rocket, inventoried at any location, by any service, can be installed on any platform, both rotary wing and fixed wing. Embodiments allow next generation of guided rockets to be more efficiently deployed over a wider variety of rotary wing and fixed wing platforms with one universal configuration.

The computing system used in the guided munition for performing (or controlling) the operations or functions described hereinabove with respect to the system and/or the method may include a processor, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for dynamic autopilot control of a projectile, comprising:
   obtaining sensor data from at least one on-board sensor, wherein said at least one sensor comprises an accelerometer, a temperature sensor, and a pressure sensor;
   providing said sensor data to at least one processor coupled to said dynamic autopilot, wherein said processor calculates at least one of Mach and dynamic pressure;
   tailoring parameters of said dynamic autopilot, said dynamic autopilot parameters comprising at least one of:
   a roll control filter parameters;
   a pitch/yaw filter parameters;
   a guidance filter parameters; and
   filtering pitch/yaw data with a pitch/yaw loop compensator such effects of coupling instabilities between pitch and yaw channels are reduced;
   guiding said projectile to a target using said dynamic autopilot control.

2. The method of claim 1, wherein said roll control filter parameters comprise a roll gain schedule.

3. The method of claim 1, wherein said pitch/yaw filter parameters comprise a pitch/yaw gain schedule.

4. The method of claim 1, wherein said pitch/yaw filter parameters comprise a pitch/yaw loop compensator frequency.

5. The method of claim 1, wherein said guidance filter parameters comprise a guidance filter bandwidth.

6. The method of claim 1, wherein said guidance filter parameters comprise a lead compensator frequency.

7. The method of claim 1, wherein said dynamic autopilot parameters comprise a navigation gain.

8. The method of claim 1, wherein roll and pitch/yaw innermost control loops are rate loops.

9. The method of claim 1, wherein said dynamic autopilot parameters comprise further control loops that depend on airframe transfer functions.

10. The method of claim 9, wherein said further control loops comprise attitude loops.

11. The method of claim 9, wherein said further control loops comprise acceleration loops.

12. The method of claim 9, wherein said further control loops comprise proportional-navigation guidance loops.

13. The method of claim 9, wherein said further control loops comprise augmented proportional-navigation guidance loops.

14. The method of claim 1, comprising airframe transfer functions comprising aerodynamic control derivatives (Cldr (M) and Cmdp(M)) and dynamic pressure (q).

15. A system for dynamic autopilot control of a projectile to a target, comprising:
   a guidance and control autopilot;
   at least one on-board sensor, wherein said at least one on-board sensor comprises an accelerometer, a temperature sensor, and a pressure sensor;
   at least one processor executing a program performing as follows:
   processing a Mach and a dynamic pressure;
   deriving parameters for said dynamic autopilot, said parameters comprising:
   a roll gain;
   a pitch/yaw gain;
   a pitch/yaw loop compensator frequency;
   a guidance filter comprising a guidance filter bandwidth and a guidance filter lead compensator frequency; and
   a navigation gain;
   wherein said dynamic autopilot guides said projectile to said target; and
   wherein a pitch/yaw loop compensator comprises at least one of a filter component that reduces effects of coupling instabilities between pitch and yaw channels or a filter component with a corner frequency related to a flight path pole wherein it is scaled by dynamic pressure.

16. The system of claim 15, wherein said roll gain is retrieved from a lookup table and scaled with measured dynamic pressure.

17. The system of claim 15, wherein at higher platform speeds associated with fixed wing platforms, said roll gain is inversely scaled with dynamic pressure whereby higher dynamic pressure and Mach sensitivity of aerodynamic control derivatives are accommodated.

18. A non-transitory computer-readable medium for dynamic autopilot control of a projectile, comprising instructions stored thereon, that when executed on at least one processor, perform the steps of:
   providing input to a guidance and control autopilot;
   said input comprising Mach and dynamic pressure;
   tailoring parameters of said autopilot, said parameters comprising:
   a roll gain;
   a pitch/yaw gain;
   a pitch/yaw loop compensator frequency;
   a guidance filter comprising a guidance filter bandwidth and a guidance filter lead compensator frequency;
   a navigation gain;
   wherein at higher platform speeds associated with fixed wing platforms, roll gains are inversely scaled with dynamic pressure whereby higher dynamic pressure and Mach sensitivity of aerodynamic control derivatives are accommodated;
   wherein a pitch/yaw loop compensator comprises a filter component with a corner frequency related to a flight path pole whereby it is scaled by dynamic pressure; and
   guiding said projectile to a target using said dynamic autopilot control.

* * * * *